United States Patent [19]

Lewis et al.

[11] Patent Number: 4,780,000
[45] Date of Patent: Oct. 25, 1988

[54] ADJUSTABLE ROD END

[75] Inventors: Raymond M. Lewis, Burnsville; John A. Bushey, Eden Prairie; Thomas A. Dettmann, New Prague; Mark D. Anderson, Atwater, all of Minn.

[73] Assignee: MTS Systems Corporation, Eden Prairie, Minn.

[21] Appl. No.: 100,170

[22] Filed: Sep. 23, 1987

[51] Int. Cl.$^4$ .............................................. F16C 23/04
[52] U.S. Cl. .................................. 384/203; 384/208; 384/258
[58] Field of Search ............... 384/203, 204, 208, 206, 384/258, 252, 247

[56] References Cited

U.S. PATENT DOCUMENTS

| | | | |
|---|---|---|---|
| 3,597,025 | 8/1971 | Ringel | 384/208 |
| 4,335,924 | 6/1982 | McCloskey | 384/203 |
| 4,615,638 | 10/1986 | Ito | 384/203 |
| 4,632,575 | 12/1986 | Alverth et al. | 384/258 |

OTHER PUBLICATIONS

Assignee drawing (no date).

Primary Examiner—Lenard A. Footland
Attorney, Agent, or Firm—Kinney & Lange

[57] ABSTRACT

A rod end has a split clamp housing which supports a bearing for transferring motion or loading forces from an actuator to another part to be loaded. An adjustable stop for the clamp is used to adjust the backlash of the bearing used with the rod end to a desired level without causing distortion. A spherical washer set is used for transferring loads between the two clamp portions. The housing for the bearing is clamped against the spherical washer set at a preselected loading so that the bearing is able to rotate and swivel as needed, but backlash is removed.

4 Claims, 1 Drawing Sheet

ADJUSTABLE ROD END

BACKGROUND OF THE INVENTION

1. Field of the Invention.

The present invention relates to housings for rod end bearings.

2. Description of the Prior Art.

In the prior art, split housings for rod end bearings have been made and sold by the applicant, and have included adjustments for the load on the external surfaces of the bearing which is carried. However, because the clamping members of the bearing housing tend to not seat properly on a stop that limits clamping movement, the device failed to operate satisfactorily. The present device utilizes a mating spherical washer and seat arrangement that insures proper seating of the parts being clamped so adequate clamping forces can be applied for eliminating backlash, and the housing will be forced to become slightly elliptical with the major axis of ellipse perpendicular to the loading direction during preloading.

SUMMARY OF THE INVENTION

The present invention relates to an adjustment device for clamping a split rod end housing onto a bearing that is positioned in the provided bore of the rod end housing at a preselected low clamp force on the bearing housing while eliminating backlash of the bearing for the design loads applied along its loading axis. The bearing housing is split along one side on a plane perpendicular to the loading axis, and a bolt or cap screw is used for clamping the bearing housing section onto the external bearing surface. An adjustable stop is provided for stopping the amount of movement of the movable part of the clamp housing relative to the base, even under very high tension loading on the clamping bolt. This controls the clearance in the housing bore and therefore the interference between that bore and the outer surface of the bearing. The amount of compression on the bearing surface controls the backlash and friction.

A spherical washer assembly is used between the adjustable stop and the movable clamp part of the bearing housing to insure that there is no misalignment of the mating surfaces that carry the loading under the high preload that is applied on the clamping bolt to avoid backlash between the bearing housing and the bearing under reciprocal loading.

DETAILED DESCRIPTION OF THE PREFERRED EMBODIMENTS

Figure 1:
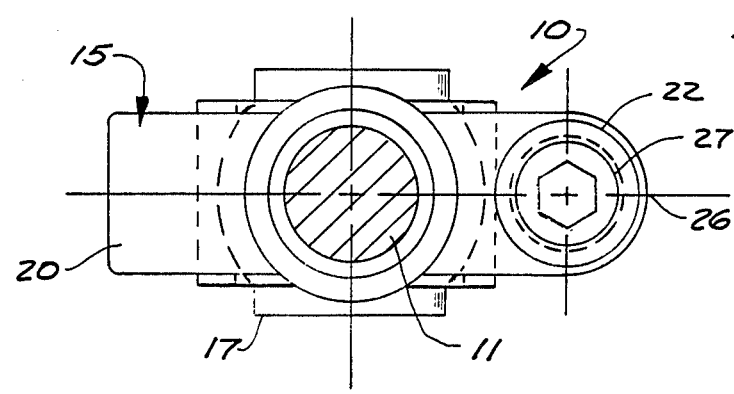
FIG. 1 is an end sectional view of a rod end made according to the present invention.
Figure 2:
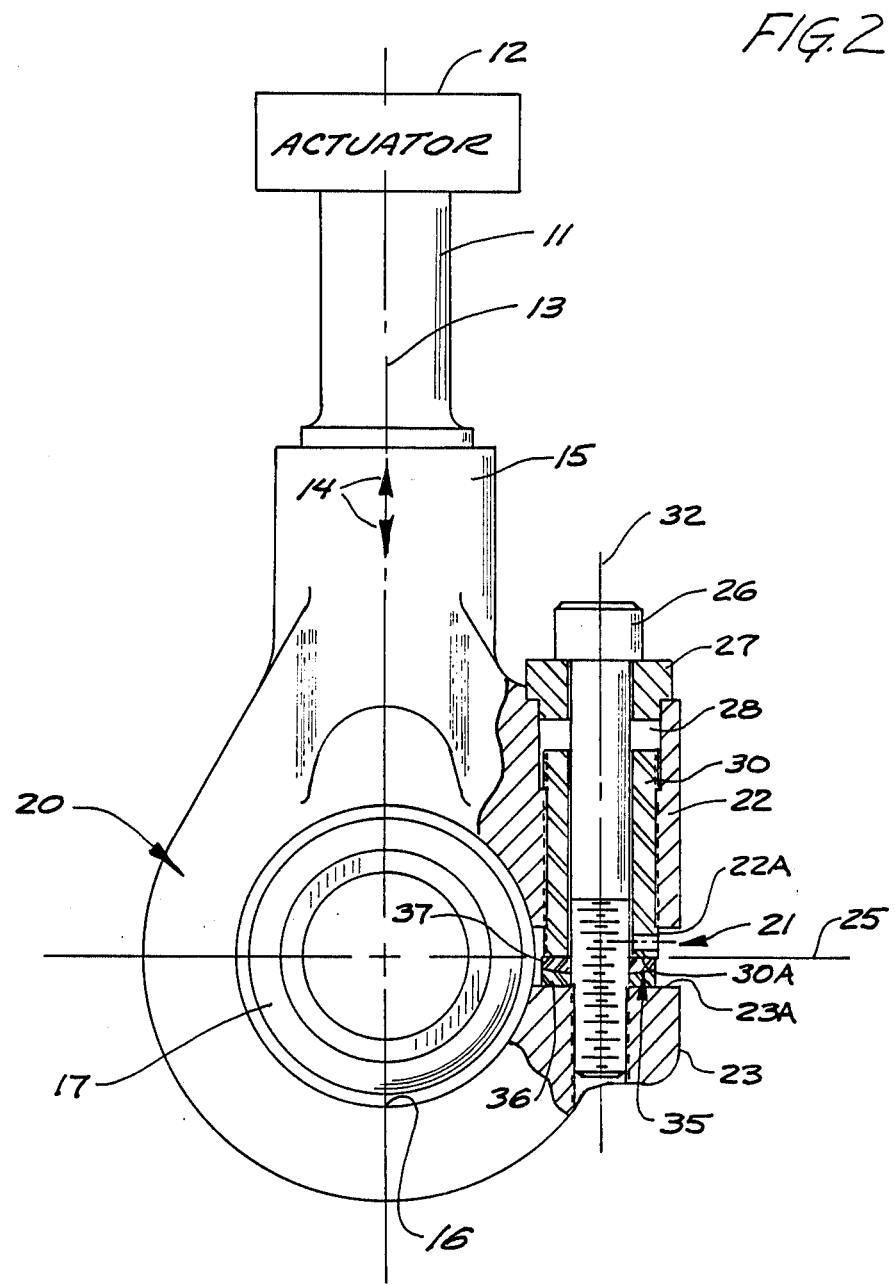
FIG. 2 is a side elevational view thereof with parts in section and parts broken away.

A rod end indicated generally at 10 which is normally used at the end of an actuator rod 11, driven by an actuator 12 that is, for example, a double acting hydraulic actuator that reciprocates along an axis indicated generally at 13, as indicated by the double arrow heads 14. The rod end has an outer housing 15 which has a central bore 16 in which a suitable spherical bearing assembly for example is mounted as indicated schematically at 17. The outer surface of the spherical bearing housing is cylindrical and will fit in a mating seat in the housing. The outer housing of bearing 17 is surrounded by a rod end clamp ring 20 that is split and has an opening 21 on one side thereof, the opening 21 divides the ring 20 into a base part 22 and a second movable or clamping part 23 with the space 21 between them. The movable part 23 has a surface 23A that is machined parallel to a central or axial plane 25 perpendicular to the loading axis 13. The base part of the clamp ring 22 formed in the rod end housing has a surface 22A that is parallel to and spaced from the surface 23A.

The spherical bearing 17 outer race has a surface that mates with the bore surface of ring 20, under a predetermined amount of clamp load, and because there is reciprocal loading along the axis 13, it is desired that there be no backlash between the bearing surfaces of the spherical bearing 17.

In order to remove backlash under reciprocal loading and to avoid any undue distortion of the bore 16, which can cause complications in the ability of the bearing 17 to swivel in the bore, a clamp bolt or cap screw 26 is provided. The clamp bolt is positioned through a short bushing 27 that is mounted in a bore 28. The bore 28 is formed in the main or base portion 22 of the ring 20 and has an axis perpendicular to the surfaces 22A and 23A. An adjustable stop 30 is threadably mounted on the interior of the bore 28 in the base of the housing for the bearing. The stop 30 has an end surface 30A that is parallel to the surface 23A, and the stop 30 can be adjusted in fine increments along the axis 32 of the bolt, which axis is parallel to the axis 13, to a desired position and form a stop surface to prevent the movable clamp portion 23 from being moved toward the base portion 22 of the ring 20 more than a desired amount.

A spherical washer set indicated at 35 is provided for insuring that the mating surfaces 23A and 30A will seat correctly. The spherical washer set includes a lower washer 36 having a concave part-spherical seat, and an upper washer 37 which has a convex part-spherical seat mating with the seat in washer portion 36.

The surfaces on the exterior of the washer portions 36 and 37 are flat, and seat on surface 23A and surface 30A. The washers 36 and 37 can swivel relative to each other so that if for example the surface 23A is cocked or tilted slightly with respect to the surface 30A, this misalignment can be accomodated in the washers 36 and 37. Then, by tightening down the bolt or capscrew 26 to a desired tension load, the clamping force or preload on the movable clamp portion 23 to hold the clamp ring 20 against the bearing 17 can be adjusted to a level so that there will be no backlash when the actuator 12 reciprocates along the axis 13. The tension loading in the bolt 12 keeps the movable portion 23 in its solid seated position against stop sleeve 30 and spherical washer set 35.

Additionally then, the position of the movable clamp portion 23 and its surface 23A is fixed, at a position set so that the friction load caused by compressing the ring 20 onto the spherical bearing 17 does not exceed a desired amount. This arrangement, then, insures that the backlash will be avoided, but that the compressive friction load on the bearing 17 will be maintained at a minimal level regardless of the direction of operation of the actuator 12.

The mating spherical washers 36 and 37 insure that the clamp portion will not deform if the surfaces 23A and 30A are not exactly parallel to the plane 25. The surface 30 is adjusted by moving the stop 30 axially. This means that the surface 23A and the surface 30A could be slightly cocked with respect to each other and this misalignment or cocking of the surfaces can be accomodated by the washers 36 and 37.

The spherical washers 36 and 37 have a circular outer periphery with central openings for receiving the bolt or capscrew 26, and the washers have the mating spherical or part-spherical seating surfaces to accomodate misalignment.

The adjustable sleeve forming a stop on the clamp base, with the spherical washer set reacting loads from the movable portion of the split clamp provides for very precise adjustment. It should be noted that the stop 30 can be adjusted by using a spanner wrench in the opening that is provided near the lower end, and the threading between the member 22 and the stop 30 can be a desired pitch for permitting precise adjustments.

The spherical washers set provides a rigid or stiff load path for the forces of the clamp bolt. This allows the bolt to be substantially free from fatigue loading and also allows the housing, washer, and stop assembly to form a rigid housing for the bearing. The adjustments allow the size of this housing bore to be precisely adjusted for a low friction and low backlash assembly.

Although the present invention has been described with reference to preferred embodiments, workers skilled in the art will recognize that changes may be made in form and detail without departing from the spirit and scope of the invention.

What is claimed is:

1. In combination with a rod end used for carrying reciprocating loading along an axis, and which rod end has a bore in the center to house a bearing that is mating with the rod end for carrying loads from the rod end, and wherein the rod end has a split housing for adjusting the clearances between the bearing and the rod end, the improvement comprising a clamping arrangement for preloading the split housing and a carried bearing to eliminate backlash in opposite directions of loading of the rod end, including a rod end ring portion, said ring portion being split to form a base clamp portion and a movable clamp portion, bolt means for providing a clamping load on the clamp portions of the ring portion proportional to the tension in the bolt means, and a spherical seat washer set between the portions of the ring that move together under tension in the bolt means, the washer set reacting forces between the two clamp portions and accomodating misalignment in the mating surfaces of the two clamp portions of the ring.

2. The apparatus as specified in claim 1 and an adjustable threadable stop acting against said spherical washer set from one of the clamp portions to limit the amount of movement of the two clamp portions together regardless of the tension applied by the bolt means, whereby said bolt means can be placed under tension to eliminate backlash in the bearing.

3. The apparatus of claim 1 wherein the spherical washer set includes a first washer having a first part spherical seat surface, and a second washer having a second mating part spherical surface, and outer surfaces transferring load between the two clamp portions.

4. The apparatus of claim 3 wherein said clamp bolt means passes through the spherical washer.

* * * * *